Feb. 21, 1961 J. A. BURTON ET AL 2,972,462
FIRE HOSE HANGER
Filed March 22, 1960
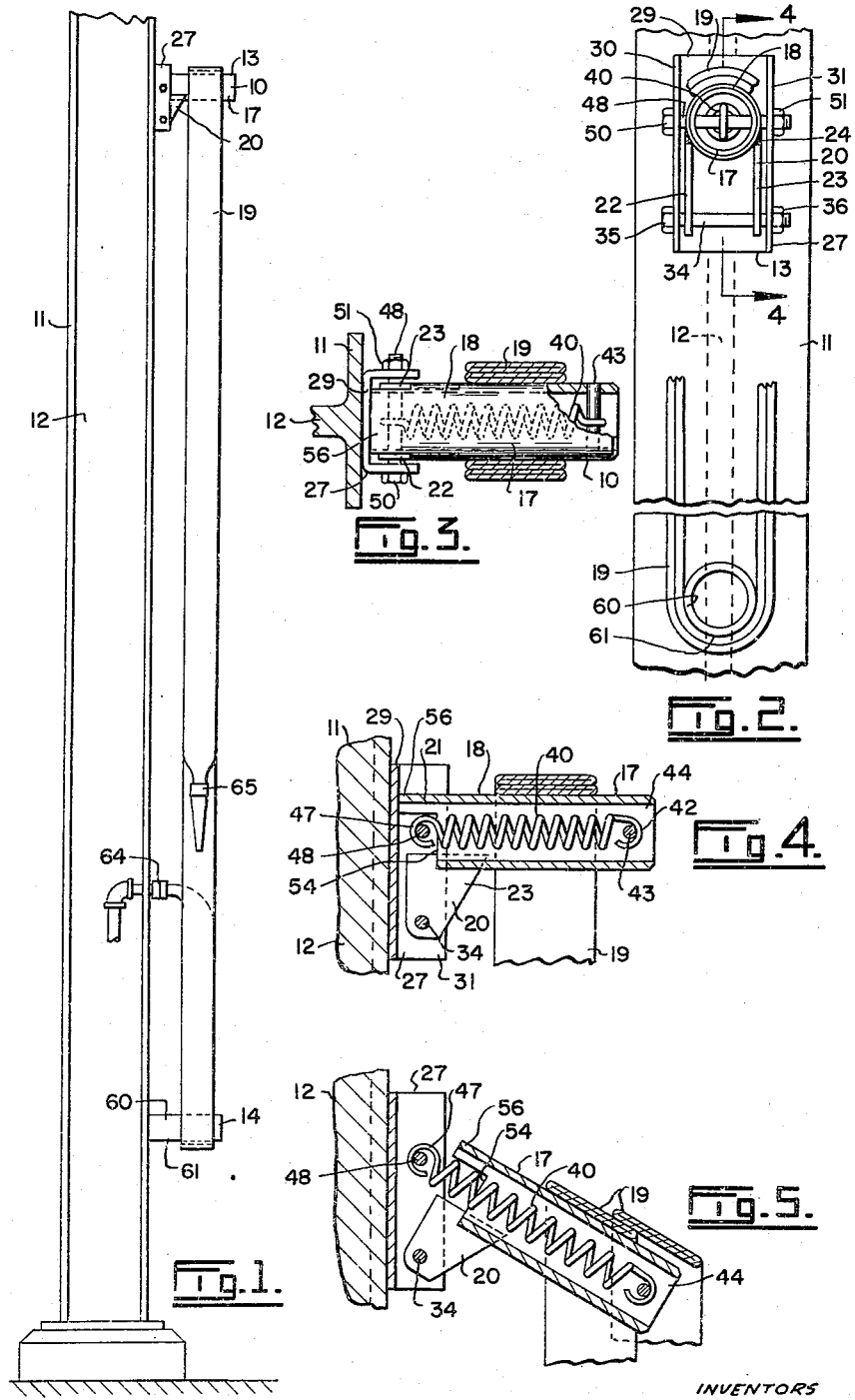
INVENTORS
JOHN A. BURTON
ALEXANDER P. TARASOFF
BY
Fetherstonhaugh & Co.
ATTORNEYS

# United States Patent Office 2,972,462
Patented Feb. 21, 1961

2,972,462

FIRE HOSE HANGER

John A. Burton, 6649 Fremlin St., and Alexander P. Tarasoff, 185 W. 42nd Ave., both of Vancouver, British Columbia, Canada Filed Mar. 22, 1960, Ser. No. 16,715

9 Claims. (Cl. 248—80)

This invention relates to a hanger particularly for fire hose, but which may be used releasably to support other types of hose or articles.

An object of the present invention is the provision of a hose hanger which projects outwardly only a very little, if any, from a standard or support, such as a wall or a building supporting column.

Another object is the provision of a fire hose hanger which will firmly hold the hose in position, and yet will quickly and easily release the hose when it is pulled from the hanger.

A further object is the provision of a hanger capable of holding a comparatively long length of hose without bulking up the hose and without causing the hose to project very far from the support on which the hanger is mounted.

A still further object is the provision of a hanger for a relatively long hose which does not require any sharp bending of the hose, and which requires very few bends in the hose as compared to its length.

A still further object is the provision of an inexpensive fire hose hanger which is easy to install, neat, long lasting, and does not require any maintenance.

The fire hose hanger now in general use consists of a bracket hingedly mounted on a support, such as a wall, for movement in a horizontal plane. The hose is folded in zig zag or accordion fashion, and each bend or loop is removably connected to the bracket. As a result of this, the hose is subjected to a great many very sharp bends, causing wear and deterioration of the hose. An objection to all the prior types of hose hangers is that they have to be mounted at a level where they can be easily reached by a man. This means that they are in the way, and are often damaged. This is a frequent occurrence in large places, such as warehouses and work shops, where vehicles, such as fork lift trucks, move about. These vehicles frequently damage the hose hangers and the hoses carried by them. This is costly, and is hazardous, particularly if a damaged hose and/or hanger is not noticed so that the hose may not be usable or may be stuck to the hanger when it is required for fighting a fire.

A firehose hanger according to the present invention includes a normally horizontal arm having inner and outer ends and an upper surface over which loops of a hose may extend. This arm is pivotally mounted for vertical swinging movement on a suitable support. Spring means extending along the arm beneath the upper surface thereof is connected to the arm near the outer end thereof and to the support near the inner end of the arm. A stop is provided against which the inner end of the arm is normally held by the spring means. This spring means is strong enough to retain the arm in its normal horizontal position with a hose thereon and yet permits the arm to swing downwardly when the hose is subjected to a downward pull to discharge the hose therefrom.

The arm arrangement described above may be used alone, but the hanger preferably includes a horizontal stud mounted in a position spaced below the horizontal arm and substantially parallel therewith. The stud and arm are so arranged that loops of a hose may be wound therearound. The pivotal mounting of the arm makes it possible to mount it above the normal reach of a man where it is out of the way, since the hose hangs downwardly therefrom and therefore may easily be grasped when it is desired to free the hose of the arm. The stud may be mounted near the floor level where it is out of the way.

A preferred form of the invention is illustrated in the accompanying drawings, in which, Figure 1 is an elevation of a post or standard with the fire hose hanger mounted thereon, the latter being shown in side elevation, Figure 2 is a front elevation of the hanger with parts of the hose thereon broken away, Figure 3 is a plan view of the hanger with part of the hose broken away, Figure 4 is a vertical section taken on the line 4—4 of Figure 2, showing a hanger arm in its normal hose-carrying position, and Figure 5 is a view similar to Figure 4, but showing the arm tilted downwardly into its unloading position.

Referring to the drawings, 10 is a hose hanger mounted on a vertical standard or post 11 of a building. The illustrated standard is in the form of an I-beam, and hanger 10 is mounted on the outer surface of a flange of this beam. However, the hanger may be mounted on the web 12 of the beam between the flanges thereof so that very little, if any, of the hanger projects outwardly beyond the beam. In the preferred form of the invention, hanger 10 includes an upper element 13 and a lower element 14 spaced therefrom. Although for some purposes the lower element may be omitted, it is generally included.

The upper hanger element 13 includes a normally horizontal arm 17 having an upper surface 18 which is preferably curved in cross section and over which loops of a hose 19 may extend. In the preferred form of the invention, the arm is in the form of a tube, as shown, the outer surface of which forms the curved upper surface 18 of the arm. A leg 20 is secured to and depends from the inner end 21 of arm 17, said leg being formed by spaced side members 22 and 23, see Figure 2, which are secured at their upper ends to the tubular arm in any convenient manner, such as welding, indicated at 24. Leg 20 and the arm may be directly mounted on support or standard 11, but it is preferable to provide a support 27 which is mounted in any convenient manner on standard 11. Support 27 is preferably in the form of a bracket having a vertical back 29 and spaced vertical flanges 30 and 31 projecting outwardly therefrom. The inner end 21 of arm 17 extends into the space between flanges 30 and 31, and normally bears against back 29. A pivot pin 34 extends through the side members 22 and 23 of leg 20, and through flanges 30 and 31. This pin may be in the form of a bolt having a head 35 on one end, and a nut 36 screwed on its opposite end. In this case, leg 20 is swingably mounted on the pin. As pin 34 is horizontal, leg 20 and arm 17 are able to swing vertically.

Spring means is provided for normally holding arm 17 in its horizontal position. This is preferably in the form of a spring 40 within and extending longitudinally of the tubular arm. One end of the spring is connected to the arm near the outer end thereof, and the opposite end of the spring is connected to support 27 near the inner end of the arm. It is also preferable pivotally to connect the ends of the spring to the arm and the support. This is accomplished by forming one end of the spring with a loop 42 extending around a horizontal pin 43 carried by arm 17 near the outer end 44 thereof. The opposite end of the spring is formed with a loop 47 extending around a horizontal pin 48 carried by flanges 30 and 31 of support bracket 27. This pin may be in the form of a bolt having a head 50 on one end and a nut 51 threaded on its opposite end. For convenience in mounting arm 17, the latter is cut away to form a notch 54 at the inner end 21 thereof. This notch opens downwardly from the arm and leaves a projection 56 thereabove which bears against bracket back 29.

The lower element 14 of hanger 10, if used, consists of a stud 60 mounted on the same support, as upper element 13 which, in this case, is standard 11. If upper element 13 were to be mounted on web 12 of standard 11, stud 60 would also be mounted on said web. This stud is substantially horizontal and is parallel with arm 17. The stud has a rounded lower surface 61, and is preferably in the form of a tube, as clearly shown in Figure 2.

Hose 19 is wound in loops around arm 17 and stud 60. One end of the hose is connected to a water outlet 64, while the opposite end thereof has a nozzle 65 attached thereto. The hose is preferably wound so that the nozzle is near the lower element stud 60.

Spring 40 is strong enough to retain arm 17 in its normal horizontal position with hose 19 thereon, and yet it will permit the arm to swing downwardly about leg pivot 34 when the hose is subjected to a downward pull. The person wanting the hose, usually grasps it near nozzle 65, and all he needs to do is pull downwardly on the hose. This causes arm 17 to swing downwardly into the position shown in Figure 5, at which time the loops of the hose slide off the arm. As soon as the arm is freed, it swings back into its normal position. It is obvious that the person grasping the hose causes this releasing action to take place as he walks away from the hanger 10.

The hose when on the hanger is not subject to any undue strain or wear since it is not gripped by anything, as is the case with some hose hangers, and the upper surface 18 of arm 17 and the lower surface 61 of stud 60 are curved and are relatively large so that the hose is not subjected to any sharp bends. As the hanger arm 17 may be tipped downwardly merely by grasping the hose, the upper element 13 may be mounted in a relatively high position well out of the reach of a man. This gets the main portion of the hanger out of the way so that it is not struck by vehicles such as are used in warehouses and the like. Another advantage is that the lower element stud 60 may be placed near the floor and therefore spaced a considerable distance from arm 17. This permits a relatively long piece of hose to be wound on hanger 10 in about two loops thereby keeping the bends in the hose down to a minimum.

Spring 40 may be relatively strong in order properly to support the hose, and yet it does not take a very great pull to tip arm 17 downwardly since the downward force is applied to the arm near the outer end thereof so that considerable leverage is supplied by the arm. As the arm is swung downwardly, spring 40 swings in the same direction and is extended only a little. Thus the spring is not subjected to any great strain during the swinging movement of the arm. As soon as the arm is released, the spring swings it back to its normal horizontal position.

What we claim as our invention is:

1. A fire hose hanger comprising a normally horizontal arm having inner and outer ends and an upper surface over which loops of a hose may extend, a leg depending from the inner end of the arm, pivot means connecting the leg to a support, said pivot means permitting the leg and arm to swing vertically, spring means extending along the arm beneath the upper surface thereof, means connecting the spring means to the arm near the outer end thereof and to the support near the inner end of the arm, and a stop against which the inner end of the arm is normally held by the spring means, said spring means being strong enough to retain the arm in its normal horizontal position with a hose thereon and yet permitting the arm to swing down through the leg pivot means when the hose is subjected to a downward pull to discharge the hose therefrom.

2. A fire hose hanger comprising a normally horizontal tubular arm having inner and outer ends, said arm forming a rounded surface over which loops of a hose may extend, a leg depending from the inner end of the arm, pivot means connecting the leg to a support, a spring within the tubular arm and extending longitudinally thereof, means connecting the spring to the arm near the outer end thereof and to the support near the inner end of the arm, and a stop against which the inner end of the arm is normally held by the spring, said spring being strong enough to retain the arm in its normal horizontal position with a hose thereon and yet permitting the arm to swing down through the leg pivot means when the hose is subjected to a downward pull to discharge the hose therefrom.

3. A fire hose hanger comprising a normally horizontal tubular arm having inner and outer ends, said arm forming a rounded surface over which loops of a hose may extend, a leg depending from the inner end of the arm, pivot means connecting the leg to a support, a spring within the tubular arm pivotally connected at one end to the arm near the outer end thereof and at its opposite end to the support above the leg pivot means, and a stop against which the inner end of the arm is normally held by the spring, said spring being strong enough to retain the arm in its normal horizontal position with a hose thereon and yet permitting the arm to swing down through the leg pivot means when the hose is subjected to a downward pull to discharge the hose therefrom.

4. A fire hose hanger comprising a support bracket having a vertical back and spaced vertical flanges projecting therefrom, a normally horizontal arm having an inner end bearing against the bracket back and an outer end, said arm having an upper surface over which loops of a hose may extend, a leg depending from the inner end of the arm, a pivot pin extending through the leg and connected to the bracket flanges, said pivot pin permitting the leg and arm to swing vertically, a spring extending along the arm beneath the upper surface thereof, means connecting the spring to the arm near the outer end thereof and to the bracket flanges near the inner end of the arm, said spring being strong enough to retain the arm in its normal horizontal position with the inner end thereof bearing against the bracket back and while carrying a hose thereon and yet permitting the arm to swing down about the leg pivot when the hose is subjected to a downward pull to discharge the hose therefrom.

5. A fire hose hanger comprising a horizontal stud connected to and projecting outwardly from a standard, a normally horizontal arm spaced above the stud and having inner and outer ends and an upper surface, said stud and arm being arranged so that loops of a hose may be wound therearound, a leg depending from the inner end of the arm, pivot means connecting the leg to the standard, said pivot means permitting the leg and arm to swing vertically, spring means extending along the arm beneath the upper surface thereof, means connecting the spring means to the arm near the outer end thereof and to the standard near the inner end of the arm, and a stop against which the inner end of the arm is normally held by the spring means, said spring means being strong enough to retain the arm in its normal horizontal position with a hose thereon and yet permitting the arm to swing down through the leg pivot means when the hose is subjected to a downward pull to discharge the hose therefrom.

6. A fire hose hanger comprising a horizontal stud connected to and projecting outwardly from a standard, a normally horizontal tubular arm spaced above the stud and having inner and outer ends, said stud and arm being arranged so that loops of a hose may be wound therearound, a leg depending from the inner end of the arm, pivot means connecting the leg to the standard, said pivot means permitting the leg and arm to swing vertically, a spring within the tubular arm and extending longitudinally thereof, means connecting the spring to the arm near the outer end thereof and to the standard near the inner end of the arm and a stop against which the inner end of the arm is normally held by the spring, said spring being strong enough to retain the arm in its normal horizontal position with a hose thereon and yet permitting the arm to swing down through the leg pivot means when the hose is subjected to a downward pull to discharge the hose therefrom.

7. A fire hose hanger comprising a horizontal stud connected to and projecting outwardly from a standard, a normally horizontal tubular arm spaced above the stud and having inner and outer ends, said stud and arm being arranged so that loops of a hose may be wound therearound, a leg depending from the inner end of the arm, pivot means connecting the leg to the standard, said pivot means permitting the leg and arm to swing vertically, a spring within the tubular arm pivotally connected at one end to the arm near the outer end thereof and at its opposite end to the standard above the leg pivot means, and a stop against which the inner end of the arm is normally held by the spring, said spring being strong enough to retain the arm in its normal horizontal position with a hose thereon and yet permitting the arm to swing down through the leg pivot means when the hose is subjected to a downward pull to discharge the hose therefrom.

8. A fire hose hanger comprising a horizontal stud connected to and projecting outwardly from a standard, a support bracket mounted on the standard above the stud, said bracket having a vertical back and spaced vertical flanges projecting therefrom, a normally horizontal arm having an upper surface and an inner end bearing against the bracket back and an outer end, said stud and arm being arranged so that loops of a hose may be wound therearound, a leg depending from the inner end of the arm, pivot means connecting the leg to the support bracket flanges, a spring extending along the arm beneath the upper surface thereof, and means connecting the spring to the arm near the outer end thereof and to the support bracket near the inner end of the arm, said spring being strong enough to retain the arm in its normal horizontal position with a hose thereon and yet permitting the arm to swing down through the leg pivot means when the hose is subjected to a downward pull to discharge the hose therefrom.

9. A fire hose hanger comprising a horizontal stud connected to and projecting outwardly from a standard, a support bracket mounted on the standard above the stud, said bracket having a vertical back and spaced vertical flanges projecting therefrom, a normally horizontal tubular arm having an inner end bearing against the bracket back and an outer end, said stud and arm being arranged so that loops of a hose may be wound therearound, a leg depending from the inner end of the arm, pivot means connecting the leg to the support bracket flanges, a spring within the tubular arm extending longitudinally thereof, and means connecting the spring to the arm near the outer end thereof and to the support bracket near the inner end of the arm, said spring being strong enough to retain the arm in its normal horizontal position with a hose thereon and yet permitting the arm to swing down through the leg pivot means when the hose is subjected to a downward pull to discharge the hose therefrom.

References Cited in the file of this patent

UNITED STATES PATENTS

| 357,900 | Boyle | Feb. 15, 1887 |

FOREIGN PATENTS

| 19,256 | Great Britain | of 1905 |
| 859,945 | France | Sept. 20, 1940 |
| 1,092,019 | France | Nov. 3, 1954 |